United States Patent
Munson (10) Patent No.: US 10,520,096 B2
(45) Date of Patent: Dec. 31, 2019

(54) INTERSHAFT SEAL ASSEMBLY

(71) Applicant: Rolls-Royce Corporation, Indianapolis, IN (US)

(72) Inventor: John Munson, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 396 days.

(21) Appl. No.: 15/288,079

(22) Filed: Oct. 7, 2016

(65) Prior Publication Data

US 2018/0180185 A1 Jun. 28, 2018

Related U.S. Application Data

(60) Provisional application No. 62/249,504, filed on Nov. 2, 2015.

(51) Int. Cl.

| | |
|---|---|
| *F16J 15/447* | (2006.01) |
| *F04D 29/10* | (2006.01) |
| *F01D 11/02* | (2006.01) |
| *F01D 5/02* | (2006.01) |
| *F16J 15/44* | (2006.01) |

(52) U.S. Cl.
CPC .......... *F16J 15/4476* (2013.01); *F01D 5/026* (2013.01); *F01D 11/02* (2013.01); *F04D 29/102* (2013.01); *F16J 15/441* (2013.01); *F05D 2240/55* (2013.01); *F05D 2240/61* (2013.01); *Y02T 50/672* (2013.01)

(58) Field of Classification Search
CPC .. F16J 15/4476; F16J 15/00; F16J 9/00; F16J 15/441; F01D 11/02; F01D 5/026; F04D 29/102; F05D 2240/55; F05D 2240/61; Y02T 50/672

USPC ......................................................... 277/418
See application file for complete search history.

(56) References Cited

U.S. PATENT DOCUMENTS

| | | | | |
|---|---|---|---|---|
| 4,972,986 A | * | 11/1990 | Lipschitz | F01D 5/026 277/361 |
| 6,196,790 B1 | * | 3/2001 | Sheridan | F01D 11/003 415/111 |
| 7,159,873 B2 | * | 1/2007 | McCutchan | F16J 15/3448 277/427 |
| 8,100,403 B2 | * | 1/2012 | Short | F01D 11/003 277/345 |

(Continued)

FOREIGN PATENT DOCUMENTS

| | | |
|---|---|---|
| EP | 2698568 A1 | 2/2014 |
| FR | 3000990 A1 | 7/2014 |

OTHER PUBLICATIONS

European Patent Office, European Extended Search Report for corresponding EP Application No. 16196755.9 dated Mar. 6, 2017, 7pgs.

*Primary Examiner* — Nathan Cumar
(74) *Attorney, Agent, or Firm* — Duane Morris LLP (57) ABSTRACT

An intershaft seal assembly comprises an annular seal ring disposed between a pair of annular runners connected to a hollow outer rotating shaft, and a surface of a co-axial inner rotating shaft. The centrifugal force resulting from rotation of the hollow outer rotating shaft effects engagement of the annular seal ring with the surface of the co-axial inner rotating shaft. The surface may be a radially-inward-facing surface of a retaining arm connected to the co-axial inner rotating shaft.

18 Claims, 7 Drawing Sheets

(56) References Cited

U.S. PATENT DOCUMENTS

| | | | | |
|---|---|---|---|---|
| 8,205,891 B2* | 6/2012 | Vasagar | ................ | F01D 11/003 |
| | | | | 277/579 |
| 8,408,555 B2* | 4/2013 | Garrison | ............... | F16C 17/045 |
| | | | | 277/306 |
| 8,888,104 B2* | 11/2014 | Garrison | .................... | F16J 9/24 |
| | | | | 277/306 |
| 9,004,495 B2* | 4/2015 | Vasagar | ................ | F01D 11/003 |
| | | | | 277/579 |
| 2013/0251523 A1* | 9/2013 | Garrison | .............. | F01D 11/003 |
| | | | | 415/231 |
| 2014/0091535 A1* | 4/2014 | Cusack | ................ | F16J 15/3284 |
| | | | | 277/641 |

* cited by examiner

INTERSHAFT SEAL ASSEMBLY

CROSS REFERENCE TO RELATED APPLICATIONS

This application claims priority to U.S. Provisional Patent Application No. 62/249,504 filed Nov. 2, 2015, the entirety of which is hereby incorporated by reference.

FIELD OF THE DISCLOSURE

The present disclosure relates generally to turbine machines, and more specifically to intershaft seal assemblies used in gas turbine engines.

BACKGROUND

Intershaft seals and intershaft seal assemblies may be used to isolate spaces between shafts in turbine engines having co-axial shafts. In one common design, a first shaft connects a fan, a first stage compressor, and a second stage turbine while a second shaft connects a second stage compressor and first stage turbine. The first shaft rotates at a relatively lower speed than the second shaft. The first and second shafts are co-axial and may be either co- or counter-rotational. To be effective, an intershaft seal must therefore isolate spaces between the shafts having potentially high differential rotational speeds, and the spaces may also have a potentially high differential pressure.

Intershaft seals are used in turbine engines which provide energy for a wide range of uses. Examples of turbine engines include turbofan, turbojet, turboshaft, and turboprop engines. As just one example of the wide range of applications such engines are suitable for, gas turbine engines are used to provide propulsion to an aircraft.

Figure 1:
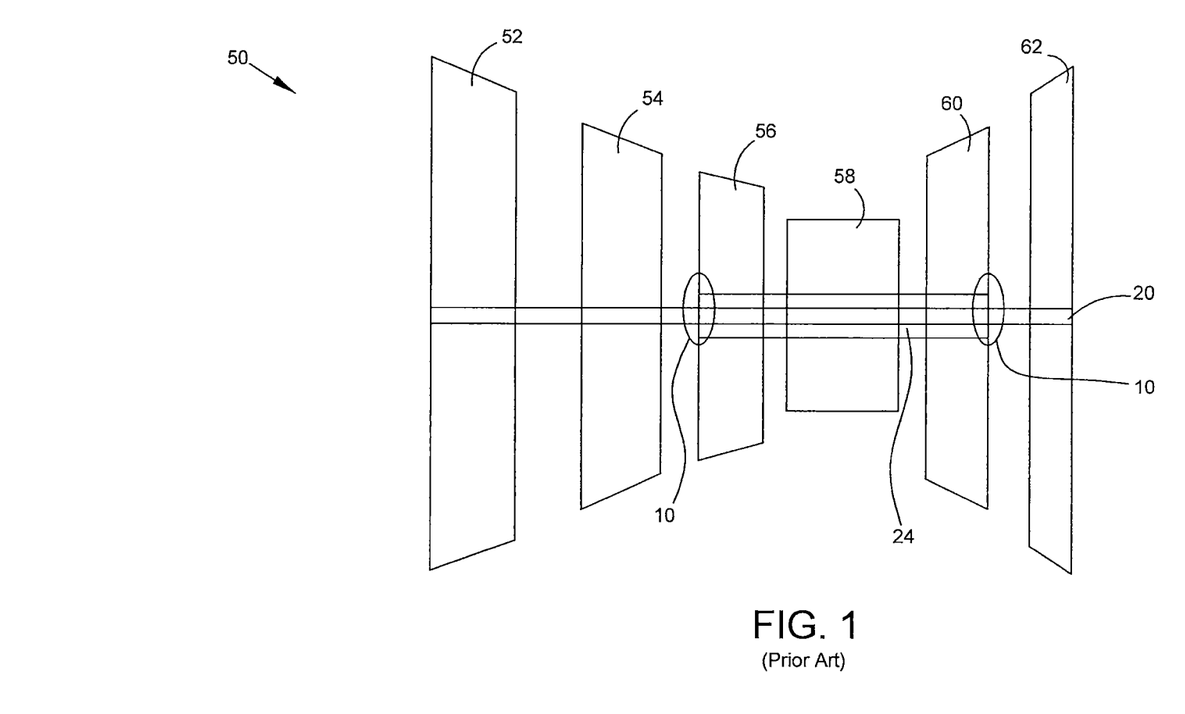
FIG. 1 is a schematic diagram of a typical dual-shaft gas turbine engine.

A typical gas turbine engine comprises an inlet fan, a compressor, a combustor, a high-pressure turbine, and a low-pressure turbine. As one example of a typical dual-shaft gas turbine engine 50, FIG. 1 illustrates a first shaft 20 which connects a fan 52, first stage compressor 54, and second stage turbine 62. A second shaft 24 is hollow and is concentrically located around first shaft 20 and connects a second stage compressor 56 with a first stage turbine 60. A combustor 58 is disposed between second stage compressor 56 and first stage turbine 60. First shaft 20 is radially inward from second shaft 24 and rotates at a relatively lower speed. Intershaft seal assemblies 10 are used at least at each axial terminus of outer shaft 24 to seal the spaces between the two concentric shafts 24, 20.

Figure 2:
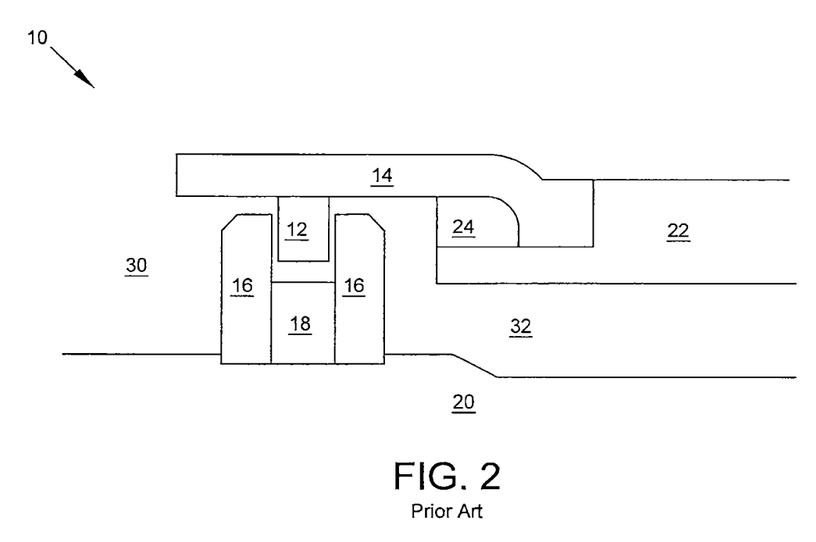
FIG. 2 is a depiction of a prior art intershaft seal assembly.

One design for an intershaft seal involves the use of a seal ring which is sometimes referred to in the art as a piston ring. FIG. 2 illustrates a seal ring design for a prior art intershaft seal. Intershaft seal assembly 10 comprises a seal ring 12 in contact with an annular retaining arm 14. The seal ring 12 is disposed between a pair of runners 16 (or retaining rings) which are spaced apart by a spacer 18 and coupled to an inner shaft 20. Retaining arm 14 is coupled to a hollow outer shaft 22 and may be held in place by a retention member 24. Inner shaft 20 and outer shaft 24 can be co- or counter-rotational. Seal assembly 10 serves to isolate high pressure fluid cavity 30 from a lower pressure fluid cavity 32.

When inner shaft 20 and outer shaft 24 are not in motion, a slight gap (not shown) is present between seal ring 12 and retaining arm 14. However, once inner shaft 20 begins to rotate the centrifugal force from rotation will move seal ring 12 radially outward and into contact with retaining arm 14. Seal ring 12 and runners 16 are initially each rotating in the same direction and at the same rotational speed as inner shaft 20. Once seal ring 12 is in contact with retaining arm 14, seal ring 12 will begin rotating in the same direction and at substantially the same rotational speed as outer shaft 24.

Figure 3:
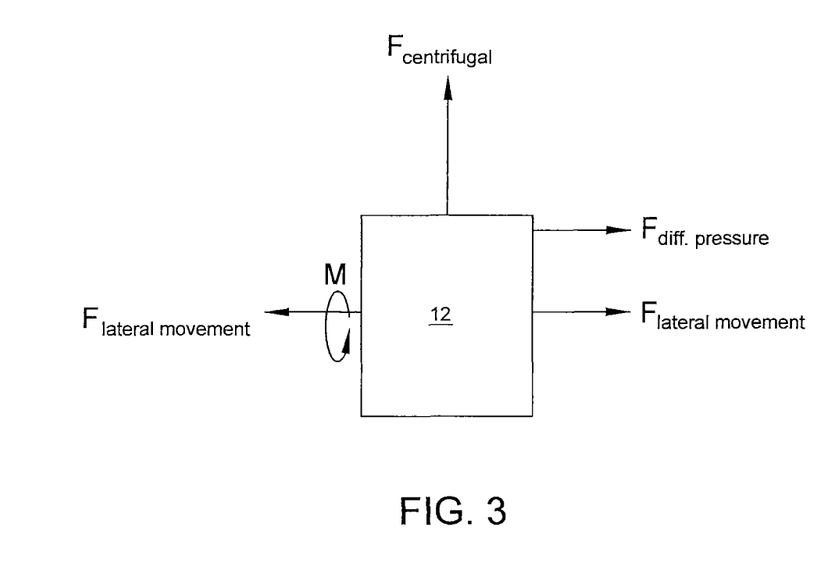
FIG. 3 is a depiction of some of the forces acting on a seal ring during rotation of the shafts.

FIG. 3 illustrates some of the forces acting on seal ring 12 during operation of the turbine engine (i.e. while inner shaft 20 and outer shaft 24 are rotating). A relatively large centrifugal force ($F_{centrifugal}$) from rotation of the inner shaft 20 acts on seal ring 12 in a radially outward direction, bringing seal ring 12 into contact with retaining arm 14. An axial differential pressure force ($F_{D/P}$) acts on seal ring 12 in the vicinity of the pressure boundary in a direction from high pressure fluid cavity 30 to low pressure fluid cavity 32. To form an effective seal, the centrifugal force must be large enough to hold seal ring 12 in contact with retaining arm 14 despite the axial force of differential pressure across the seal ring 12.

Forces caused by relative lateral motion ($F_{lateral\ movement}$) between the inner shaft 20 and outer shaft 24 act on seal ring 12 in a direction either axially forward or axially aft. Finally a moment M, sometimes referred to as ring tension, resists radial expansion during rotation of seal ring 12.

The configuration described above with reference to FIGS. 2 and 3 has drawbacks. The difference in rotational speeds between inner shaft 20 and outer shaft 24 creates high friction between seal ring 12 (rotating with outer shaft 24) and runners 16 (rotation with inner shaft 20) during transients when the forces caused by relative lateral movement between the shafts overcomes the centrifugal force effecting contact between seal ring 12 and the outer shaft retaining arm 14 thus forcing the seal ring 12 to contact the forward or aft runner 16. This high friction can cause excessive heat generation in the seal assembly 10 as well as a high wear rate of seal ring 12.

Thus there is a need in the art for an effective intershaft seal assembly which is better suited to resist heat generation and wear of the seal ring.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The present disclosure is directed to an intershaft seal assembly to overcome the aforementioned deficiencies. More specifically, this disclosure is directed to an intershaft seal assembly which reduces heat generation and seal right wear during operation. Detailed descriptions of various embodiments of the disclosed intershaft seal assembly, and additional advantages thereof, are presented below.

Figure 4A:
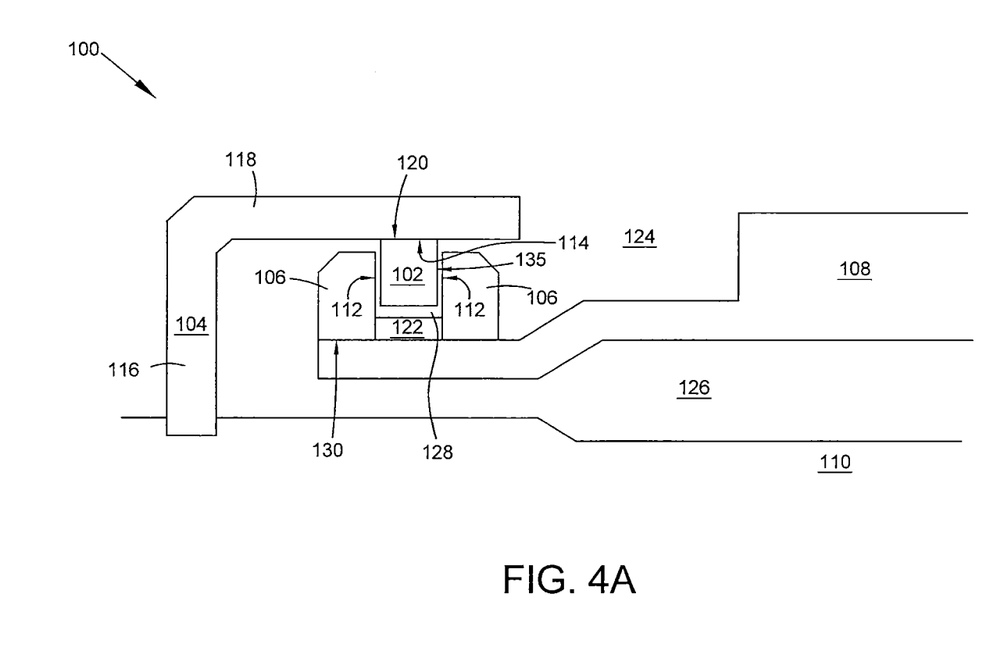
FIG. 4A is a depiction of an intershaft seal assembly in accordance with some embodiments of the present disclosure.
Figure 4B:
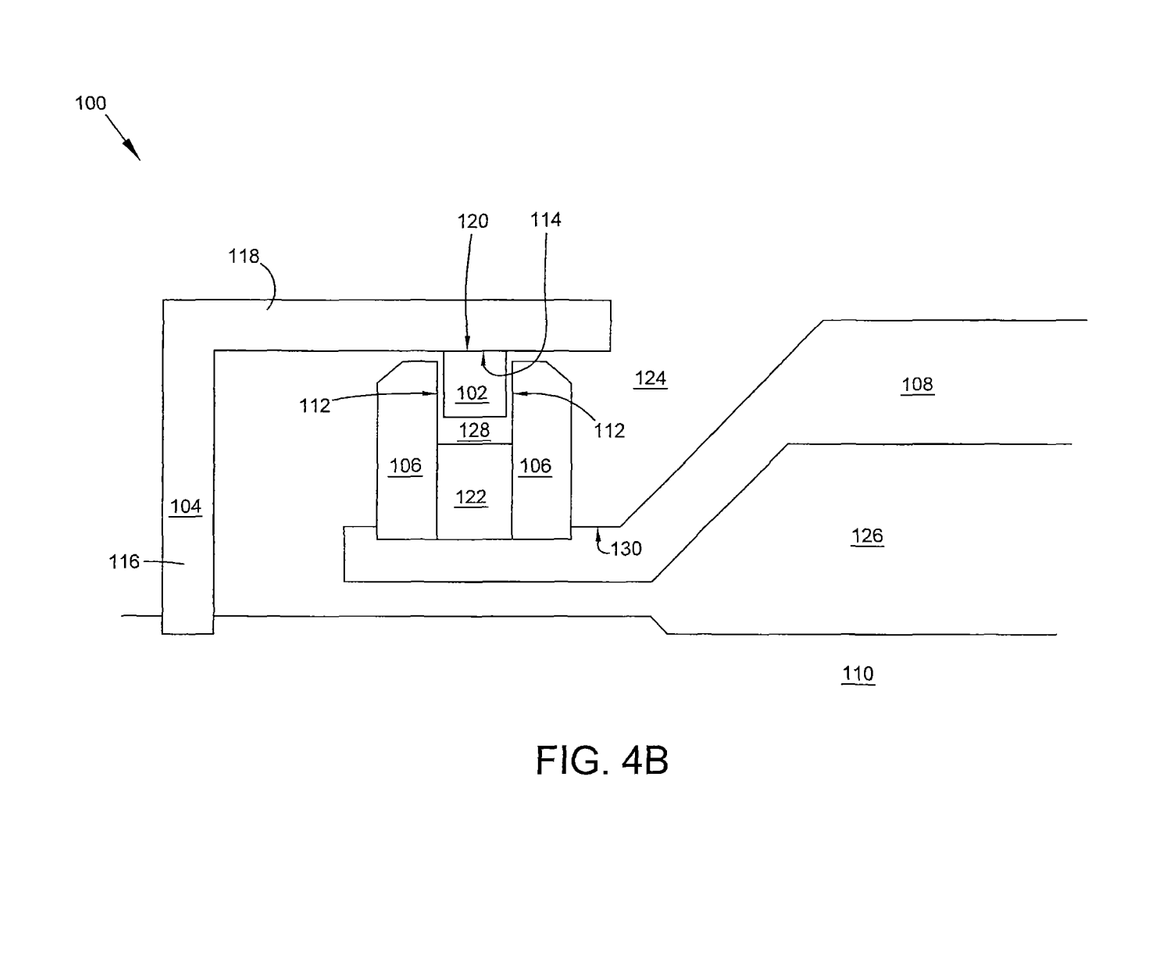
FIG. 4B is a depiction of an intershaft seal assembly in accordance with some embodiments of the present disclosure.
Figure 4C:
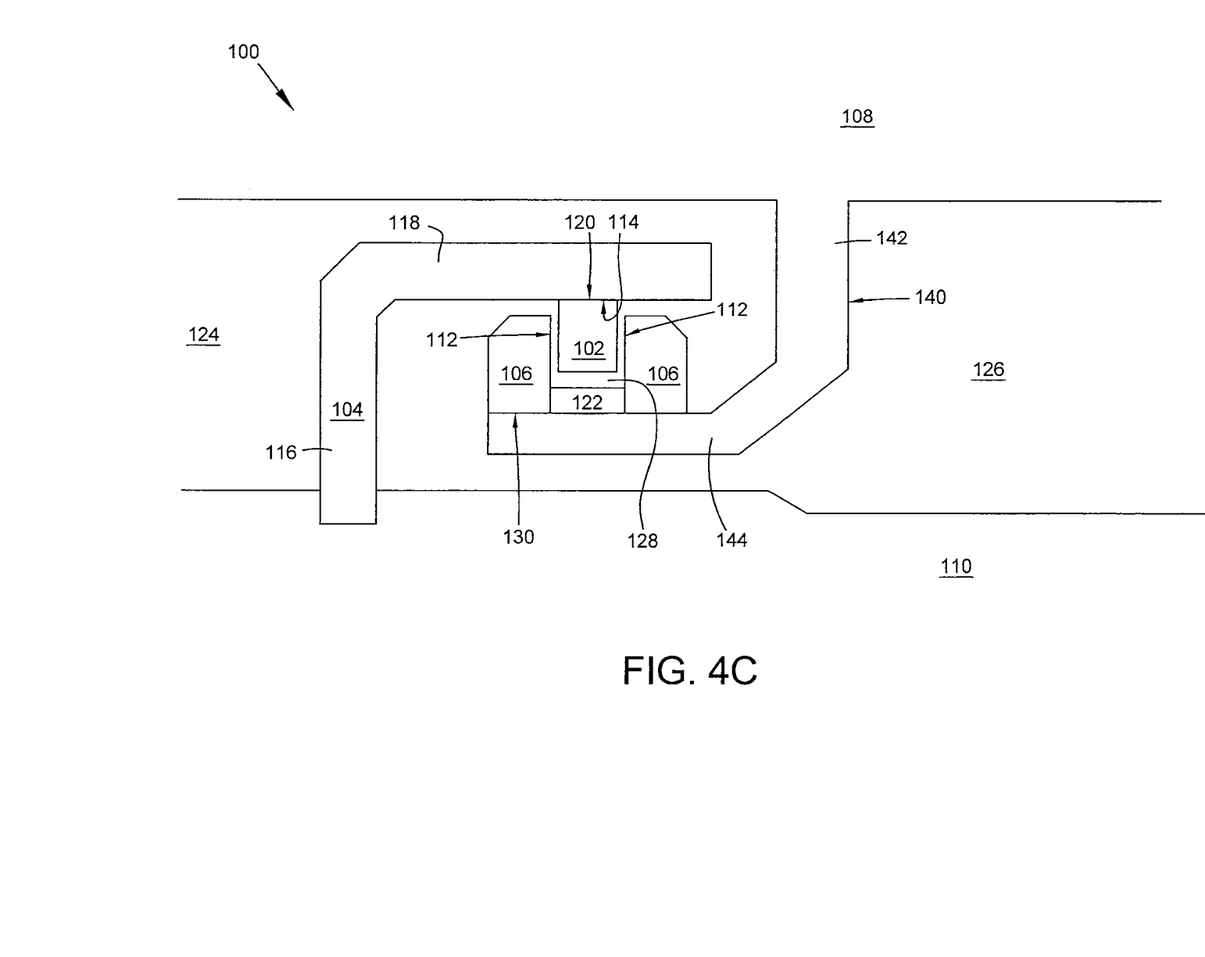
FIG. 4C is a depiction of an intershaft seal assembly in accordance with some embodiments of the present disclosure.

FIGS. 4A, 4B, and 4C are depictions of an intershaft seal assembly 100 in accordance with some embodiments of the present disclosure. The embodiments illustrated in FIGS. 4A and 4B are most suitable for sealing an axial end of an outer shaft, while the embodiment of FIG. 4C can be used for seals located apart from the outer shaft axial end.

Seal assembly 100 comprises an annular seal ring 102 engaged with a retaining arm 104. Seal ring 102 is positioned between a pair of axially spaced annular runners 106 which are connected to a first shaft 108. Retaining arm is connected to a second shaft 110. First shaft 108 is hollow, and second shaft 110 is positioned within and co-axial to first shaft 108. Second shaft 110 can be referred to as the inner shaft, while first shaft 108 can be referred to as the outer shaft. In some embodiments the second shaft 110 operates at a relatively lower speed (in rotations per minute) than the first shaft 108.

Annular seal ring 102 is positioned between a pair of annular runners 106. Each runner 106 comprises an axially-facing, radially-extending side surface 112. Runners 106 are arranged to create an opposing pair of side surfaces 112, with seal ring 102 positioned between these opposing side faces 112. Runners 106 are connected to an outer surface 130 of first shaft 108.

In some embodiments runners 106 are axially spaced apart by spacer 122. In some embodiments, such as that shown in FIG. 4A, spacer 122 is slightly larger in the axial dimension than seal ring 102 resulting in a small gap 135 between seal ring 102 and runners 106.

In some embodiments a void 128 is present, bounded by seal ring 102, spacer 122, and side surfaces 112. In some embodiments the radial dimension of void 128 is greater than the radial distance between radially-inward facing surface 120 and a radially-outward facing surface of runner 106 to ensure that seal ring 102 does not "bottom out" or contact spacer 122 as a result of radial motion between first shaft 108 and second shaft 110.

Seal ring 102 has a radially-outward-facing surface 114. In some embodiments, seal ring 102 is segmented, or formed from overlapping seal ring segments which together form an annular seal ring 102. In other embodiments, seal ring 102 is a continuous annular ring. In some embodiments seal ring 102 is formed from a carbon-graphite material. Such material is low density, low friction, and relatively low modulus of elasticity. In other embodiments seal ring 102 is formed from materials having a higher stiffness such as carbon-carbon composite or ceramic.

Retaining arm 104 extends radially outward from second shaft 110. In some embodiments, retaining arm 104 may be "L" or "J"-shaped member with a first radially-outward extending section 116 and a second axially-extending section 118. Retaining arm 104 has a radially-inward facing surface 120 adapted for engagement with seal ring 102. In some embodiments the radially-inward facing surface 120 is disposed on second axially-extending section 118. In some embodiments radially-inward facing surface 120 is disposed on second shaft 110.

Seal assembly 100 divides a high pressure fluid cavity 124 from a low pressure fluid cavity 126. When first shaft 108 and second shaft 110 are not rotating, a small gap may be present between surface 114 of seal ring 102 and surface 120 of retaining arm 104. As first shaft 108 begins to rotate, runners 106, spacer 122, and seal ring 102 will initially rotate with first shaft 108. Centrifugal forces will act on seal ring 102 in a radially outward direction to effect engagement between surface 114 of seal ring 102 and surface 120 of retaining arm 104. Once surface 114 is engaged with surface 120, seal ring 102 will begin to rotate with second shaft 110.

In some embodiments oil cooling and/or lubrication is provided to the engagement of surface 114 with surface 120, and/or to the engagement of surfaces 112 with seal ring 102.

Figure 5:
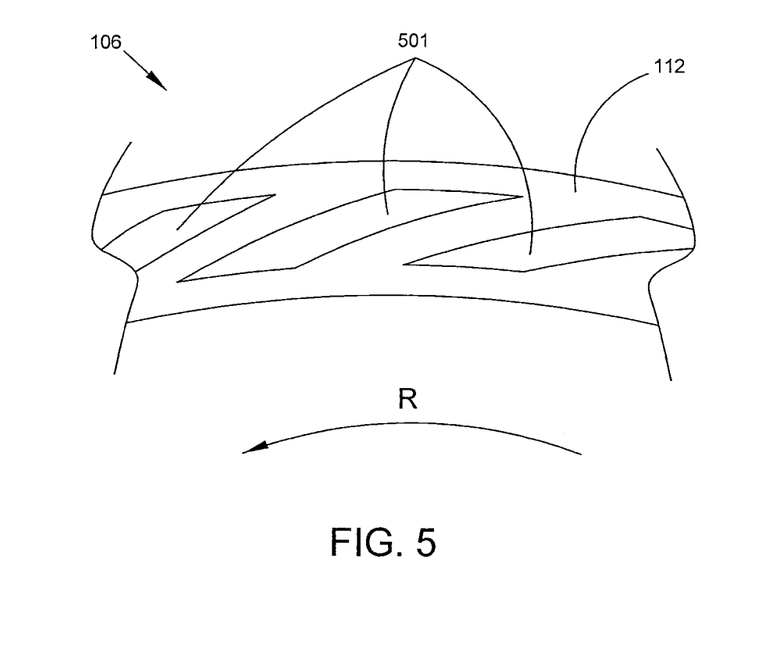
FIG. 5 is a side profile view of the side surface of a runner in accordance with some embodiments of the present disclosure.

In some embodiments, the axially-facing, radially-extending side surface 112 of each runner 106 includes a plurality of hydrodynamic grooves 501. FIG. 5 is a side profile view of the side surface 112 of a runner 106 in accordance with some embodiments of the present disclosure. As shown in FIG. 5, hydrodynamic grooves 501 are generally formed as arcuate-shaped, shallow slots along the side surface 112. Additional shapes and dimensions of hydrodynamic grooves 501 are contemplated. A direction of rotation R is also illustrated. Hydrodynamic grooves 501 improve fluid flow around the seal ring 102 and minimize contact and friction between seal ring 102 and runner 106. In other embodiments, pads are provided between side surfaces 112 and seal ring 102.

As shown in FIG. 4C, the disclosed intershaft seal assembly 100 is not required to be used at the end of a first shaft 108. In some embodiments, runners 106 are connected to first shaft 108 via a connecting arm 140 having a radially extending member 142 and an axially extending member 144. The axially extending member 144 has a radially outward facing outer surface 130 to which runners 106 are connected.

Although the disclosed intershaft seal assembly 100 is discussed with reference to a two-shaft turbine engine, one of skill in the art would understand that applications of the disclosed assembly 100 are not so limited. For example, the disclosed assembly 100 can be applied to turbine engines having multiple stages and multiple (three or more) shafts. The disclosed assembly 100 can be used to isolate high and low pressure spaces between each set of shafts.

The disclosed intershaft seal assemblies provide numerous advantages over the prior art. In the disclosed embodiments, the seal ring 102 is brought into contact with a retaining arm 104 that rotates at the speed of the second (inner) shaft 110. Since second shaft 110 typically operates at a lower rotational speed than the first shaft 108, less centrifugal force is acting to engage seal ring 102 to retaining arm 104. As a result, during lateral movements between the first shaft 108 and second shaft 110, less heat is generated and there is lower wear during operation. When first shaft 108 and second shaft 110 move axially relative to one another, such axial movement is less likely to damage seal ring 102 as it is engaged with retaining arm 104 with less force than in the prior art. In other words, because the retaining arm 104 is connected to the slower-speed second shaft 110, seal ring 102 is held to or engaged with retaining arm 104, and rotates with retaining arm 104, at a lower centrifugal force. This lower force is sufficient to isolate high pressure fluid cavity 124 from low pressure fluid cavity 126, but is reduced when compared to the prior art and therefore causes less wear and damage to seal ring 102. Initial studies of the disclosure suggest heat generation is lowered by 60% when compared to the prior art. Further reductions are attainable—up to 80% when compared to the prior art—when the disclosure is used with high-stiffness seal rings such as those composed of silicon carbide.

The present disclosure further overcomes a root cause of excessive heat generation and wear of seal rings: that the radial loading generated by centrifugal forces is much greater than what is required to overcome axial loading generated by differential pressure. In essence, prior art seals are sealed too tightly—radially loaded against a retaining arm too strongly—and therefore excessive heat and wear can be caused by axial movement between shafts and axial or radial distortions. Since radial loading is proportional to speed squared, engaging the seal ring with the lower speed shaft's retaining arm can greatly reduce radial loading and the consequent heat and wear.

Another factor that affects the amount of centrifugal force developed is related to the specific strength of the material used to fabricate the seal ring 102. Specific strength is Youngs modulus divided by the material density. A material with a high specific strength will have some advantage in that the tension developed as the ring 102 expands radially can help to counter some of the centrifugal force. This is a relatively smaller advantage than making the lower speed shaft the outer and the high speed shaft the inner. The ring tension that can be developed is limited by the strength of the material and the initial radial gap between the outer diameter of the seal ring 102 and the inner diameter of the outer shaft 108. Very high stiffness materials such as ceramic tend to have limited tensile strengths compared with steel for example. Designing with too large a gap will result in a dynamic instability of the seal ring 102. In other words, instead of expanding uniformly the seal ring 102 will instead bounce around in the free space between the two annular runners 106 and the two shafts 108, 110. This will most likely result in damage or failure of the seal ring 102.

A review of likely candidate materials will reveal that almost all suitable candidates are surprisingly similar in specific stiffness. Materials with low density tend to have low strength and materials with high strength tend to also have higher density. A potential way around this problem is to remove material that adds weight, but does not contribute substantially to stiffness of the piston ring. For a seal ring 102 with a square or rectangular cross section, that implies that the material in the middle of the cross section should not be present. Using conventional fabrication techniques this implies that a seal ring 102 cross section that looks like an inverted U would be superior to a solid square. Using additive manufacturing it may be possible to print a seal ring 102 with solid side walls, and a honeycomb like interior. Both of these techniques essentially reduce the mass of the seal ring 102 without significantly changing the stiffness of the cross section. The result effectively increases the specific stiffness of the seal ring 102 and at the same time reduces the centrifugal loading.

The present application discloses one or more of the features recited in the appended claims and/or the following features which, alone or in any combination, may comprise patentable subject matter.

According to an aspect of the present disclosure, a seal assembly for sealing a high pressure fluid cavity from a low pressure fluid cavity, the cavities at least partially disposed between a hollow rotating shaft and a co-axial rotating shaft at least partially disposed within the hollow rotating shaft, the seal assembly comprises a pair of annular axially-spaced runners attached to an outer surface of a first of the shafts, the runner having opposed axially-facing radially-extending side surfaces; an annular seal ring positioned between the runners, the annular seal ring having a radially-outward facing surface wherein rotation of the first shaft effects engagement of the radially-outward facing surface with a surface rotating with the second of the shafts; wherein the first of the shafts is the hollow rotating shaft.

In some embodiments the hollow rotating shaft and the co-axial rotating shaft are adapted for counter-rotation. In some embodiments the hollow rotating shaft and the co-axial rotating shaft are adapted for co-rotation. In some embodiments the surface rotating with the second of the shafts is a radially-inward-facing surface of an annular retaining arm connected to the second shaft. In some embodiments the hollow rotating shaft is connected to at least one of a plurality of compressor blades or a plurality of turbine blades. In some embodiments the co-axial rotating shaft is connected to at least one of a plurality of fan blades, a plurality of compressor blades, or a plurality of turbine blades. In some embodiments the seal assembly further comprises a spacer between the pair of axially-spaced runners. In some embodiments the seal assembly further comprises a plurality of hydrodynamic grooves formed in the axially-facing radially-extending side surfaces of the pair of axially-spaced runners.

According to an aspect of the present disclosure, an intershaft seal assembly for sealing a high pressure cavity from a low pressure cavity between a first hollow shaft and a second shaft co-axial with and disposed at least partially within the first hollow shaft, the intershaft seal assembly comprises a pair of axially-spaced annular runners connected to the first hollow shaft; an annular seal ring disposed between the runners, the annular seal ring having a radially-outward facing surface; a retaining arm connected to the second shaft having a radially-inward facing surface; and wherein the rotation of the first hollow shaft effects engagement of the radially-outward facing surface of the annular seal ring with the radially-inward facing surface of the retaining arm.

In some embodiments the retaining arm comprises a radially extending member and an axially-extending member, and wherein the radially-inward facing surface is disposed on the axially-extending member. In some embodiments the runners are connected to the first hollow shaft via a connecting arm comprising a radially-extending member and an axially-extending member, wherein the runners are connected to a radially-outward facing surface of the axially-extending member. In some embodiments the first hollow shaft is adapted to rotate at a higher rotational speed than the second shaft. In some embodiments the first hollow shaft is adapted to counter-rotate the second shaft. In some embodiments the first hollow shaft is adapted to co-rotate the second shaft. In some embodiments the annular seal ring further having axially-facing radially-extending side faces which are spaced from axially-facing radially-extending side faces of the runners. In some embodiments the intershaft seal assembly further comprises a spacer between the pair of axially-spaced runners. In some embodiments the first hollow shaft is connected to at least one of a plurality of blades of a high pressure compressor stage or a plurality of blades of a high pressure turbine stage. In some embodiments the second shaft is connected to at least one of a plurality of fan blades of a turbine fan, a plurality of blades of a low pressure compressor stage, or a plurality of blades of a low pressure turbine stage. In some embodiments the intershaft seal assembly further comprises a plurality of hydrodynamic grooves formed in the axially-facing radially-extending side surfaces of the pair of axially-spaced runners.

Although examples are illustrated and described herein, embodiments are nevertheless not limited to the details shown, since various modifications and structural changes may be made therein by those of ordinary skill within the scope and range of equivalents of the claims.

What is claimed is:

1. A seal assembly for sealing a higher pressure fluid cavity from a lower pressure fluid cavity, the seal assembly comprising:
    a hollow rotatable shaft having an outer surface;
    a co-axial rotatable shaft at least partially disposed within the hollow rotatable shaft, wherein the hollow rotatable shaft and the co-axial rotatable shaft at least partly define the higher pressure fluid cavity and the lower pressure fluid cavity;
    a pair of annular axially-spaced runners attached to the outer surface of the hollow rotatable shaft, the runners having opposed axially-facing radially-extending side surfaces;
    an annular seal ring positioned between said runners, the annular seal ring having a radially-outward facing surface; and
    an annular retaining arm attached to the co-axial rotatable shaft at a portion of the co-axial rotatable shaft not disposed within the hollow rotatable shaft, the annular retaining arm comprising a first portion extending radially from the co-axial rotatable shaft and a second portion extending axially from the first portion, the second portion defining a radially-inward facing surface positioned radially outward of a portion of the hollow rotatable shaft and the annular seal ring, wherein a radial height of the first portion of the retaining arm is greater than a radial height of the pair of annular axially-spaced runners;
    wherein rotation of the hollow rotatable shaft effects engagement of said radially-outward facing surface of said annular seal ring with said radially-inward facing surface of said retaining arm.

2. The seal assembly of claim 1 wherein said hollow rotatable shaft and said co-axial rotatable shaft are adapted for counter-rotation.

3. The seal assembly of claim 1 wherein said hollow rotatable shaft and said co-axial rotatable shaft are adapted for co-rotation.

4. The seal assembly of claim 1 wherein said hollow rotatable shaft is connected to at least one of a plurality of compressor blades or a plurality of turbine blades.

5. The seal assembly of claim 4 wherein said co-axial rotatable shaft is connected to at least one of a plurality of fan blades, a plurality of compressor blades, or a plurality of turbine blades.

6. The seal assembly of claim 1 further comprising a spacer between said pair of axially-spaced runners.

7. The seal assembly of claim 1 further comprising a plurality of hydrodynamic grooves formed in the axially-facing radially-extending side surfaces of said pair of axially-spaced runners.

8. An intershaft seal assembly comprising:
    a hollow rotatable shaft defining an axis of rotation, the hollow rotatable shaft extending axially to a terminus and having a radially outer shaft surface and a radially inner shaft surface;
    a co-axial rotatable shaft at least partially disposed within and extending axially beyond the terminus of the hollow rotatable shaft;
    a pair of axially-spaced annular runners connected to said radially outer shaft surface of said hollow rotatable shaft;
    an annular seal ring disposed between said runners at a first axial position, said annular seal ring having a radially-outward facing seal surface;
    a retaining arm connected to said co-axial rotatable shaft, the retaining arm comprising a radially-extending portion at a second axial position displaced from the first axial position and an axially-extending portion having a radially-inward facing surface positioned radially outward of the terminus and the first axial position, wherein a radial height of the radially-extending portion of the retaining arm is greater than a radial height of the pair of axially-spaced annular runners;
    a first fluid cavity at least partly defined between the radially inner shaft surface of the hollow rotatable shaft and the co-axial rotatable shaft; and
    a second fluid cavity at least party defined by the radially outer shaft surface of the hollow rotatable shaft;
    wherein the rotation of said hollow rotatable shaft effects engagement of said radially-outward facing surface of said annular seal ring with said radially-inward facing surface of said retaining arm to thereby form a boundary between said first fluid cavity and said second fluid cavity.

9. The intershaft seal assembly of claim 8 wherein said runners are connected to said hollow rotatable shaft via a connecting arm comprising a radially-extending member and an axially-extending member, wherein said runners are connected to a radially-outward facing surface of said axially-extending member.

10. The intershaft seal assembly of claim 8 wherein said hollow rotatable shaft is adapted to rotate at a higher rotational speed than said co-axial rotatable shaft.

11. The intershaft seal assembly of claim 10 wherein said hollow rotatable shaft is adapted to counter-rotate said co-axial rotatable shaft.

12. The intershaft seal assembly of claim 10 wherein said hollow rotatable shaft is adapted to co-rotate said co-axial rotatable shaft.

13. The intershaft seal assembly of claim 12, said annular seal ring further having axially-facing radially-extending side faces which are spaced from axially-facing radially-extending side faces of said runners.

14. The intershaft seal assembly of claim 13 further comprising a spacer between said pair of axially-spaced runners.

15. The intershaft seal assembly of claim 14 wherein said hollow rotatable shaft is connected to at least one of a plurality of blades of a high pressure compressor stage or a plurality of blades of a high pressure turbine stage.

16. The intershaft seal assembly of claim 15 wherein said co-axial rotatable shaft is connected to at least one of a plurality of fan blades of a turbine fan, a plurality of blades of a low pressure compressor stage, or a plurality of blades of a low pressure turbine stage.

17. The seal assembly of claim 13 further comprising a plurality of hydrodynamic grooves formed in the axially-facing radially-extending side surfaces of said pair of axially-spaced runners.

18. The seal assembly of claim 8 wherein the seal ring has a U-shaped cross section.

\* \* \* \* \*